United States Patent [19]

Iino et al.

[11] 4,425,634
[45] Jan. 10, 1984

[54] DETECTION SYSTEM

[75] Inventors: Hiroshi Iino; Toyoki Sasakura, both of Nishinomiya, Japan

[73] Assignee: Furuno Electric Co., Ltd., Nishinomiya, Japan

[21] Appl. No.: 289,682

[22] Filed: Aug. 3, 1981

[30] Foreign Application Priority Data

Aug. 26, 1980 [JP] Japan .................................. 55-118004

[51] Int. Cl.³ .......................... G01S 3/80; G01S 3/52
[52] U.S. Cl. .................................... 367/120; 343/418; 367/104; 367/105; 367/122
[58] Field of Search .............. 367/100, 120, 122, 103, 367/105, 905, 104; 343/113 DE

[56] References Cited

U.S. PATENT DOCUMENTS

| | | | |
|---|---|---|---|
| 2,405,281 | 8/1946 | Bemis .................................. | 367/120 |
| 3,015,800 | 1/1962 | Jewett et al. ..................... | 367/105 X |
| 3,230,501 | 1/1966 | Yagelowich ..................... | 367/122 X |
| 3,307,190 | 2/1967 | Clay, Jr. et al. ................. | 367/122 X |
| 3,846,745 | 11/1974 | Hill et al. ............................. | 367/122 |
| 4,003,016 | 1/1977 | Remley ................................. | 367/122 |
| 4,060,792 | 11/1977 | van Heynigen ................ | 367/905 X |
| 4,166,999 | 9/1979 | Brady ................................ | 367/122 X |
| 4,233,678 | 11/1980 | Brady ................................ | 367/122 |

Primary Examiner—Richard A. Farley
Attorney, Agent, or Firm—Jordan & Hamburg

[57] ABSTRACT

The present invention is directed to a detection system which forms reception beams successively in a series of angular directions. The detection system comprises receiving means for receiving incoming signals in such a manner that the frequency of the incoming signals is varied in accordance with the Doppler effect, and a matched filter for pulse-compressing output signals from said receiving means, with output signals from said matched filter being displayed in an indicator.

14 Claims, 9 Drawing Figures

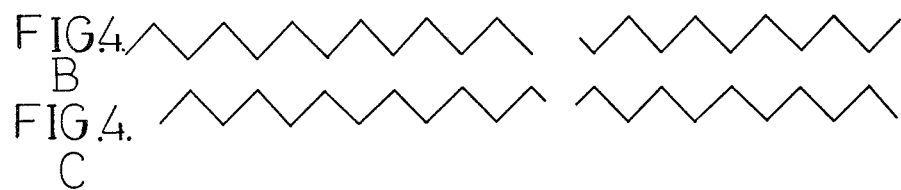

DETECTION SYSTEM

BACKGROUND OF THE INVENTION

This invention relates to a detection system for receiving incoming signals coming from many different directions and presenting indications of for example the direction and/or range of a source of incoming signals.

Particularly, it relates to a detection system in which a plurality of reception beams are formed successively in angular directions by combining output signals from a plurality of receiving elements positioned at different points on a straight or a curved line, and to an improved detection system of the type, featuring a considerably increased number of reception beams.

The invention can be applied in underwater detection systems such as fish finding apparatuses, radar apparatuses, and direction finders.

Hereinafter, the invention will be explained as embodied in an underwater detection system although as explained above the invention is not limited to that particular system.

A prior art underwater detection system of the type is disclosed in U.S. Pat. No. 3,846,745. The underwater detection system comprises a plurality of ultrasonic transducers equidistantly spaced on a circle, an interpolator for producing interpolated reception signals, a beamformer comprising a plurality of delaying elements each coupled to the transducers through the interpolator, a switching unit for connecting each of the transducers to the interpolator, and an indicator for indicating the output signals of the beamformer. Groups of the transducers are successively selected out of the plurality of the transducers by the switching unit for reception of incoming signals which are transmitted to the beamformer, so that reception beams are formed sequentially in a series of angular directions. However, the prior art underwater detection system has several drawbacks, one of which is that the switching unit needs many switches to properly successively selected predetermined groups of the transducers, thus making the interconnections between the switches and transducers complicated, another drawback being that the switching unit produces noises when switching operations are performed.

Accordingly, an object of the present invention is to provide a detection system which is constructed on a novel conception.

Another object of the invention is to provide an underwater detection system which is constructed in a small size by considerably reducing the number of the switches.

Another object of the invention is to provide an underwater detection system free from switching noises.

SUMMARY OF THE INVENTION

In order to achieve these and other objects of the invention, a detection system for receiving incoming signals from many directions and presenting indications resulting from the incoming signals on an indicating means is provided which comprises (1) receiving means for receiving incoming signals in such a manner that the frequency of the incoming signals is varied in accordance with the Doppler effect, (2) a matched filter for pulse-compressing output signals from the receiving means, (3) indicating means for indicating output signals from the matched filter, and (4) control means for controlling the receiving means and indicating means so that these two means are associated with each other.

The principle of forming reception beams by an underwater detection system according to this invention will be explained hereinafter.

Frequency modulated wave signals with its frequency being linearly varied by kT during a period T are given as follows:

$$f(t) = e^{j(W_o t - \frac{1}{2}kt^2)} \qquad (1)$$

where $k = (2\pi B)/T$

B: the range of the frequency variation.

In the underwater detection system, the signals substantially expressed by the equation (1) are obtained by the receiving means which receives signals coming from a source thereof in such a way that the frequency of the incoming signals is shifted in accordance with the Doppler effect. The signals represented by the equation (1) are supplied to the matched filter having a characteristic of an impulse response given by the following equation.

$$h(t) = e^{j(W_o t + \frac{1}{2}kt^2)} \qquad (2)$$

The output of the matched filter is given as follows:

$$g(\tau) = f(t) \circledast h(t) \qquad (3)$$

$$= \int_{-\infty}^{\infty} f(t) \cdot h(\tau - t) dt$$

$$= \int_{\tau - \frac{T}{2}}^{\tau + \frac{T}{2}} e^{j(W_o t - \frac{1}{2}kt^2)} \cdot e^{j\{W_o(\tau - t) + \frac{1}{2}k(\tau - t)^2\}} dt$$

$$= e^{j(W_o \tau + \frac{1}{2}k\tau^2)} \int_{\tau - \frac{T}{2}}^{\tau + \frac{T}{2}} e^{-jk\tau t} dt$$

$$= \frac{\sin \frac{k\tau}{2} T}{\frac{k\tau}{2}} e^{j(W_o \tau - \frac{1}{2}k\tau^2)}$$

The equation (3) shows that the magnitude of output signals from the matched filter becomes maximun at $\tau = 0$, and the width of the input signal T is compressed to a pulse width 1/B. Thus, a reception beam is formed by the underwater detection system.

Other objects and features of the present invention will be described in more detail herein with reference to the accompanying drawings.

BRIEF DESCRIPTION OF THE DRAWINGS

FIGS. 4A, 4B and 4C are diagrams for explaining the operation of the receiving means shown in FIG. 2.

DETAILED DESCRIPTION OF THE PREFERRED EMBODIMENTS

Figure 1:
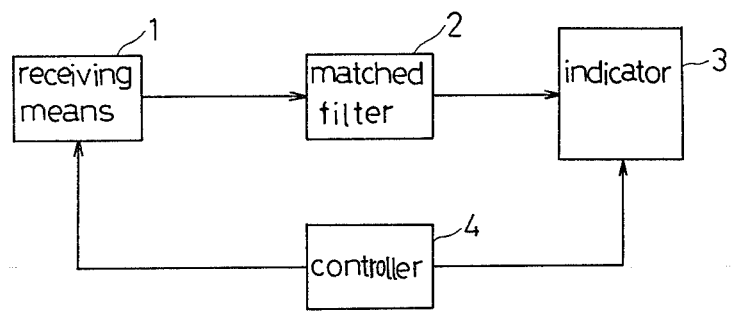
FIG. 1 is a schematic block diagram of an embodiment of the present invention.
Figure 3:
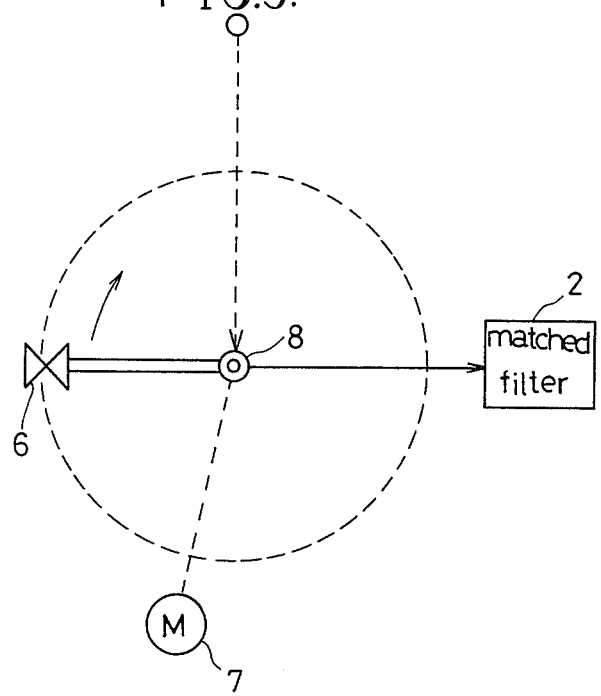
FIG. 3 is an explanatory diagram of the receiving means used in the embodiment shown in FIG. 1.

Referring to FIG. 1, a receiving means 1 may comprise an ultrasonic transducer 6 being rotated at a constant speed as shown in FIG. 3, which transmits the reception signals caught thereby to a matched filter 2. The transducer 5 having a directivity pattern of 70 degrees at half power points is turned around an axis 8 by a motor 7 which is controlled by a controller 4. Assuming, as in FIGS. 1 and 3, that a signal source 9 transmitting signals of a constant frequency is located at a point above the transducer 6, the transducer 6 comes nearer, faces and then goes away from the siganl source 6 as the former turns around. Thus, the frequency of the signals received by the transducer 6 is shifted in accordance with the Doppler effect, and is almost linearly varied against time when the transducer moves over the distance along its path corresponding to an angle of 90 degrees about the center of the circular locus of the rotating transducer 6, thus being substantially expressed by the equation (1). Although the construction of the matched filter 2 will be explained in detail later, the matched filter 2 is constructed as having a characteristic of the impulse response expressed by the equation (2). As explained in the foregoing, the matched filter 2 compresses in duration the input signals supplied from the transducer 6 and then transmits the pulse-compressed output signals expressed by the equation (3) to an indicator 3. Thus, the matched filter 2 supplies the reception signals corresponding to a reception beam formed to the indicator 3. The controller 4 comprises an oscillator and control signal generators for producing control signals in response to output signals from the oscillator, with the control signals being supplied to and thereby driving the receiving means 1 and the indicator 3 in synchronism. As the transducer 6 is turned further around, reception beams are formed successively and continuously in a series of angular directions at a high speed, and the incoming signals caught by the reception beams are successively supplied to the indicator 3. The indicator 3 may comprise a cathode-ray tube, the screen of which is scanned in concentric circles by the electron beam thereof in synchronism with the successive formation of the reception beams in angular directions, thereby presenting a PPI indication.

As the transducer is turned around, reception beams are successively formed at a high speed and the reception signals caught by each of the beams are transmitted to the indicator 3, so that the entire underwater surrounding conditions are displayed on the screen of the indicator 3 in a PPI indication.

Figure 2:
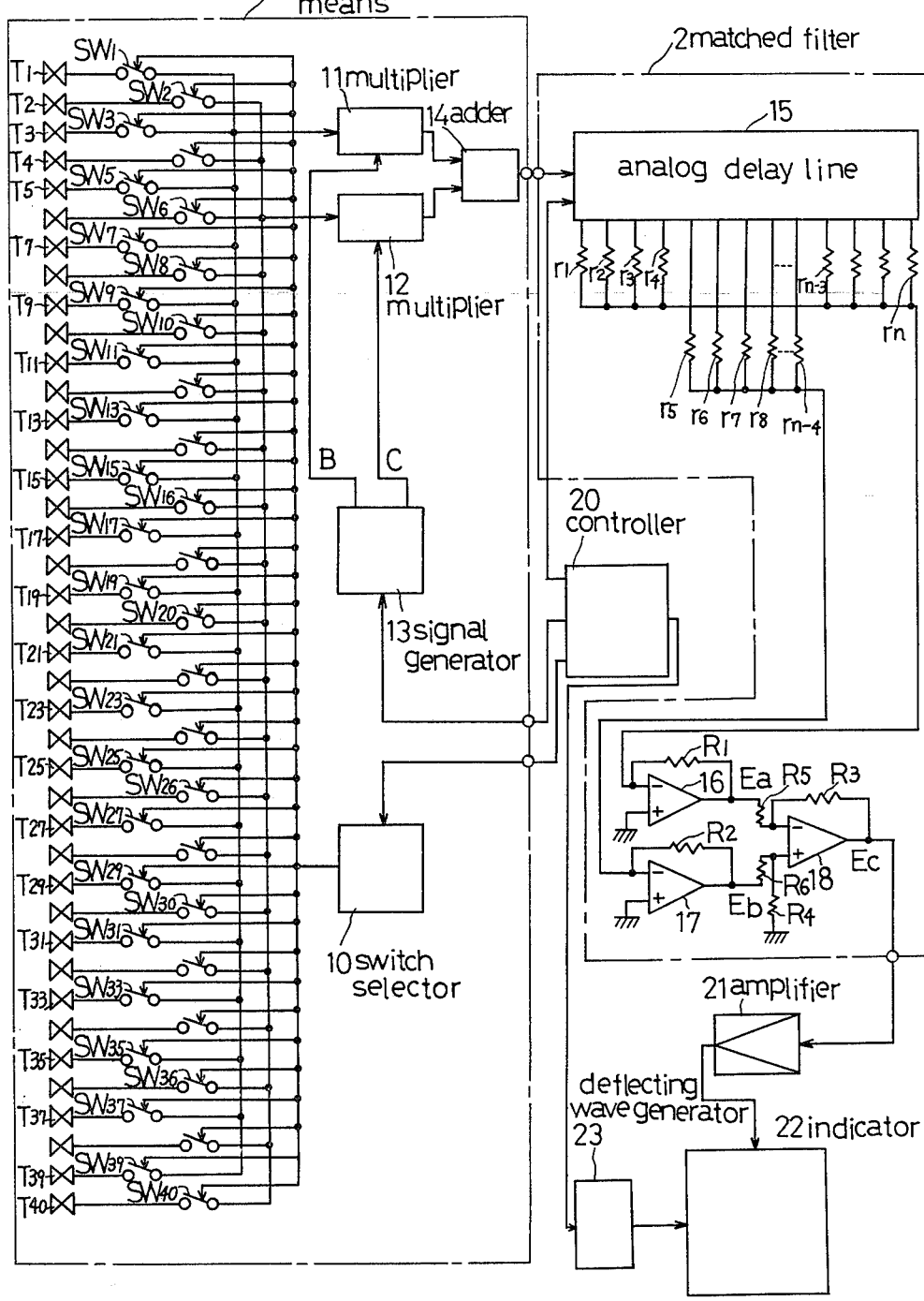
FIG. 2 is a detailed schematic block diagram of the embodiment shown in FIG. 1.

Referring to FIG. 2, the receiving means 1 comprises ultrasonic transducers, $T_1, T_2, T_3$ - - - $T_{40}$, switches $SW_1, SW_2, SW_3$ - - - $SW_{40}$, a switch selector 10, multipliers 11, 12, a signal generator 13, and an adder 14. The ultrasonic transducers $T_1, T_2, T_3$ - - - $T_{40}$ are disposed on a circle as equidistantly spaced and are made to receive incoming signals at all times. The reception signals caught by the transducers $T_1, T_3, T_5$ - - - $T_{39}$ are respectively transmitted to one input of the multiplier 11 through the switches $SW_1, SW_3, SW_5$ - - - $SW_{39}$, whereas the reception signals caught by the transducers $T_2, T_4, T_6$ - - - $T_{40}$ are respectively transmitted to one input of the multiplier 12 through the switches $SW_2, SW_4, SW_6$ - - - $SW_{40}$. The switches may comprise gates and are successively driven in the order of $SW_1, SW_2, SW_3$ - - - $SW_{40}$ by the rectangular waves produced from the switch selector 10 in the manner illustrated in FIG. 4A. When, after the switch $SW_1$ is turned on, a half duration of the rectangular wave has lapsed and the reception signals caught by the transducer $T_1$ has passed through the switch $SW_1$, the switch $SW_2$ is turned on and the signals received by the transducer $T_2$ are allowed to pass therethrough. When the remaining half duration of the rectangular wave further passes, the switch $SW_1$ is turned off and instead the switch $SW_3$ is switched on to pass reception signals from the transducer $T_3$ to the multiplier 11, but the switch $SW_2$ keeps passing the reception signals from the transducer $T_2$ to the multiplier 12. When a half duration of the next rectangular wave further passes, the switch $SW_2$ is turned off and the switch $SW_4$ corresponding to the transducer $T_4$ is switched on. In the same manner, the switches $SW_5, SW_6, SW_7$ - - - $SW_{40}$ corresponding to the transducers $T_5, T_6, T_7$ - - - $T_{40}$ are successively switched and the reception signals caught by the transducers are transmitted to the multipliers 11 or 12. The switch selector 10 produces rectangular waves in response to the output signals from a controller 20. The signal generator 13 produces two sequences of triangular waves with a phase-shift of 180 degrees therebetween as illustrated in FIGS. 4B and 4C in response to the output signals from the controller 20, and sends them to the other inputs of the multipliers 11, 12 respectively. The multiplier 11 multiplies the reception signals from the transducers designated by odd numbers as applied at one input thereof, by the triangular wave (FIG. 4B) applied at the other input in order to obtain interpolated signals which are supplied to one input of the adder 14. As easily seen in FIG. 4, switching operations by the switches $SW_1, SW_3, SW_5$ - - - $SW_{39}$ corresponding to the transducers $T_1, T_3, T_5$ - - - $T_{39}$ are performed when the magnitude of the triangular waves is zero. Thus, the multiplier 11 produces output signals containing no noise, even if noise of great magnitude is produced and supplied to the multiplier 11 when switching operations are performed. In the same manner, the multiplier 12 multiplies the reception signals from the transducers designated by even numbers, by the triangular wave (FIG. 4C) applied at the other input, and supplies the resulting product containing no switching noise to the other input of the adder 14. The adder 14 adds the output signals from the multiplier 11 and the output signals from the multiplier 12 to one another and transmits the resulting interpolated signals which are substantially equivalent to the signals obtained by the single transducer rotating at a constant speed and are expressed by the equation (1), to the matched filter 2. As easily understood, the multipliers 11, 12, the signal generator 13 and the adder 14 form a smoothing means for producing the interpolated signals.

The matched filter 2 having a characteristic of the impulse response given the equation (2) comprises an analog delay line 15, resistors $\gamma_1, \gamma_2, \gamma_3$ - - - $\gamma_n$, operational amplifiers 16, 17, 18, and resistors $R_1, R_2, R_3, R_4, R_5, R_6$. The analog delay line 15 may comprise a plurality of TAD-32 manufactured by EG & G RETICON with output taps equidistantly spaced along the line, with the reception signals being supplied from the receiving means 1 to one input thereof and the clock pulses produced from the controller 20 being supplied to the other input thereof. The output signals of the receiving means 1 are advanced through the delay line 15 every time a clock pulse is applied thereto. In the delay line 15, the reception signals coming from different directions within an angle of for example 90 degrees are stored from the right end to the left end thereof, and thus appear at each of the output taps. The output signals appearing at the output taps of the delay line 15 are weighted by the resistors $\gamma_1, \gamma_2, \gamma_3 \text{---} \gamma_n$ and the resulting signals are then supplied to one inputs of the operational amplifiers 16 and 17. The other inputs of the operational amplifier 16 and 17 are grounded. The resistors $R_1$ and $R_2$ are respectively connected between the inputs and outputs of the operational amplifiers 16 and 17. The outputs of the operational amplifiers 16 and 17 are respectively connected to the inputs of the operational amplifier 18 through the resistors $R_5$ and $R_6$. The resistor $R_3$ is connected between one input and the output of the operational amplifier 18. The resistor $R_4$ is connected between the other input and the ground. To the input of the operational amplifier 16 are supplied the signals obtained by sampling the positive part of the frequency modulated reception signals applied to the analog delay line 15. Assuming that the voltage values appearing at the output taps of the analog delay line 15 are respectively expressed as $V_1, V_2, V_3 \text{---} V_n$, the output Ea of the operational amplifier 16 is given as follows:

$$Ea = \left( \frac{V_1}{\gamma_1} + \frac{V_2}{\gamma_2} + \frac{V_3}{\gamma_3} + \frac{V_4}{\gamma_4} + \ldots + \frac{V_n}{\gamma_n} \right) R_1$$

To the input of the operational amplifier 17, on the other hand, are supplied the signals obtained by sampling the negative part of the reception signals applied to the analog delay line 15. The output Eb of the operational amplifier 17 is given as follows:

$$Eb = \left( \frac{V_5}{\gamma_5} + \frac{V_6}{\gamma_6} + \frac{V_7}{\gamma_7} + \frac{V_8}{\gamma_8} + \ldots + \frac{V_{n-4}}{\gamma_{n-4}} \right) R_2$$

The output Ec of the operational amplifier 18 becomes as follows:

$$Ec = Ea - Eb = \left( \frac{V_1}{\gamma_1} + \frac{V_2}{\gamma_2} + \frac{V_3}{\gamma_3} + \frac{V_4}{\gamma_4} + \ldots \frac{V_n}{\gamma_n} \right) R_1 + \left( \frac{V_5}{\gamma_5} + \frac{V_6}{\gamma_6} + \frac{V_7}{\gamma_7} + \frac{V_8}{\gamma_8} + \ldots + \frac{V_{n-4}}{\gamma_{n-4}} \right) R_2$$

The value of each of the resistors $\gamma_1, \gamma_2, \gamma_3, \text{---} \gamma_n$ is determined in such a way that the waves resembling in form those obtained by reversing the direction of advance of the frequency shifted wave signals stored in the delay line 15 are obtained at the output terminal of the operational amplifier 18, when a single impulse is advanced in the delay line at the same rate as the one at which the transducers are successively switched. Thus, a matched filter having a characteristic of the impulse response expressed by the equation (2) is obtained. Assuming that a signal source is located in a direction of 0 degree with respect to the receiving transducers and the signals coming from the directions within a sector of an angle of 90 degrees at the receiving point subtending from a direction of −45 degrees to a direction of +45 degrees are stored in the delay line 15, the magnitude of the output signal from the operational amplifier 18 becomes maximum. If a signal source is located in a direction other than 0 degree, the magnitude of the output signal from the operational amplifier 18 decreases considerably as compared with the one obtained when a signal source is positioned in a direction of 0 degree. Thus, the output signals from the operational amplifier 18 comprise mainly the incoming signals from the direction of 0 degree, forming a reception beam in that direction. The output signals from the matched filter 2 are transmitted to the brightness control terminal of the indicator 22 through an amplifier 21 after being amplified and rectified thereby. A deflecting wave generator 23 produces in response to the output signals from the controller 20 the deflecting waves which cause the electron beam of the cathode-ray tube to be swept in concentric circles on the screen thereof.

As the transducers are successively switched by the switches in the order of $T_1, T_2, T_3, \text{---} T_{40}, T_1, T_2 \text{---} T_{40}$, the incoming signals from a signal source producing signals of a constant frequency are received in such a way that the frequency of the received signals is varied in accordance with the Doppler effect, and are successively advanced in the analog delay line 15 to reach the right-most memory element and are stored therein. Assuming that a signal source is located in a direction of 0 degree with respect to the receiving means 1 and the reception signals coming from the directions within a sector of 90 degrees subtending from the direction of −45 degrees through the direction of +45 degrees, the signal source is displayed in the direction of 0 degree on the face of the indicator 22. As the transducers are further switched, new reception signals enter the delay line 15 and advance therein, with the oldest stored signals disappearing, so that no target signals are displayed in the direction of 0 degree on the face of the indicator 22. If a signal source is located in a direction of +45 degrees with respect to the receiving means 1, it is displayed on the face of the indicator in the same direction when the reception signals coming from the directions within a sector of 90 degrees subtending from a direction of 0 degree to a direction of 90 degrees are stored in the analog delay line 15.

As easily understood from the foregoing explanation, reception beams are successively formed almost continuously in an angular direction, as the transducers are successively switched in the order $T_1, T_2, T_3, \text{---} T_{40}$.

It should be noted that although the ultrasonic transducers are disposed on a circle at a distance interval corresponding to an angle of 9 degrees about the center of the circular transducer array in the foregoing embodiment, the transducers may also be placed on a circle at a distance interval corresponding to a smaller angle for example 2 or 3 degrees in order to obtain the same result as the one obtainable in the above embodiment. In this case, the output signals from the switches are directly supplied to the analog delay line 1 without being passed through the multipliers 11, 12 and the adder 14.

It should be noted that although the ultrasonic transducers are equi-distantly disposed on a circle in the foregoing embodiment, the transducers may also be disposed on an arc of a circle.

Figure 5:
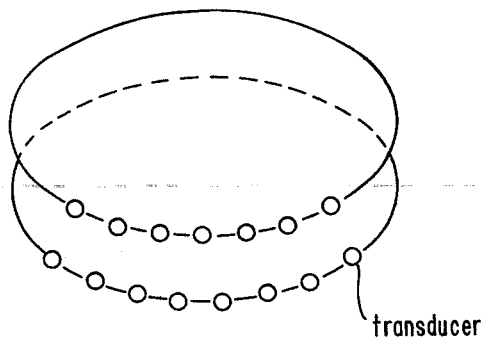
FIG. 5 is a view of a transducer arrangement comprising two parallel circular arrays.

It should be noted that although the ultrasonic transducers are disposed on a circle at a distance interval in the foregoing embodiment, the transducers may be disposed on two parallel circles circumscribed around a cylinder in such a way that a half of the transducers and the remaining half of the transducers are respectively disposed on a first circle and a second circle with each of the transducers on said first circle and the adjacent one of the transducers on said second circle being equidistantly spaced in plan (see FIG. 5). In this case, the output signals from the transducers placed on the first circle are supplied to the multiplier 11, while the output signals from the transducers arranged on the second circle are supplied to the multiplier 12.

It should be noted that although transducers having a directivity pattern of 70 degrees at half power points is used in the foregoing embodiment, transducers having directivity patterns of larger degrees up to 360 degrees at half power points can also be used.

It should be noted that although the signal generator 13 produces triangular waves for the multipliers 11, 12 in the foregoing embodiment, it can also produce and transmit sine or consine waves thereto to obtain the same result as in the above embodiment.

It should be noted that although the reception signals coming from directions within the sector of an angle of 90 degrees about the center of the circular array are stored in the analog delay line 15, the analog delay line can be constructed to store the reception signals coming from directions within the sector of an angle larger or smaller than 90 degrees.

It should be noted that although a cathode-ray tube is used in the indicator in the foregoing embodiment, a so-called plasma display or an array of light-emitting diodes can also be used.

Figure 6:
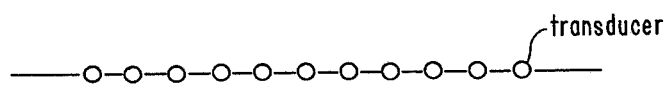
FIG. 6 is a view of a transducer line array.

It should be noted that although the ultrasonic transducers are disposed on a circle or an arc of a circle in the foregoing embodiment, they can be arranged on a straight line or other kinds of curved lines to obtain the same result as the one in the above embodiment (see FIG. 6). In this case, the speed of successive switching of the switches must be appropriately controlled so that reception beams are successively formed, with the construction of the remaining elements being almost the same. The transfer speed of the reception signals in the analog delay line must be the same as the switching speed of the switches.

It should be noted that antennas and a surface acoustic wave device such as type F-1361 manufactured by the Toshiba Corporation, having a characteristic of the impulse response expressed by the equation (2) can be used to provide a detection system which receives and indicates high-frequency incoming signals as radar target signals.

Figure 7:
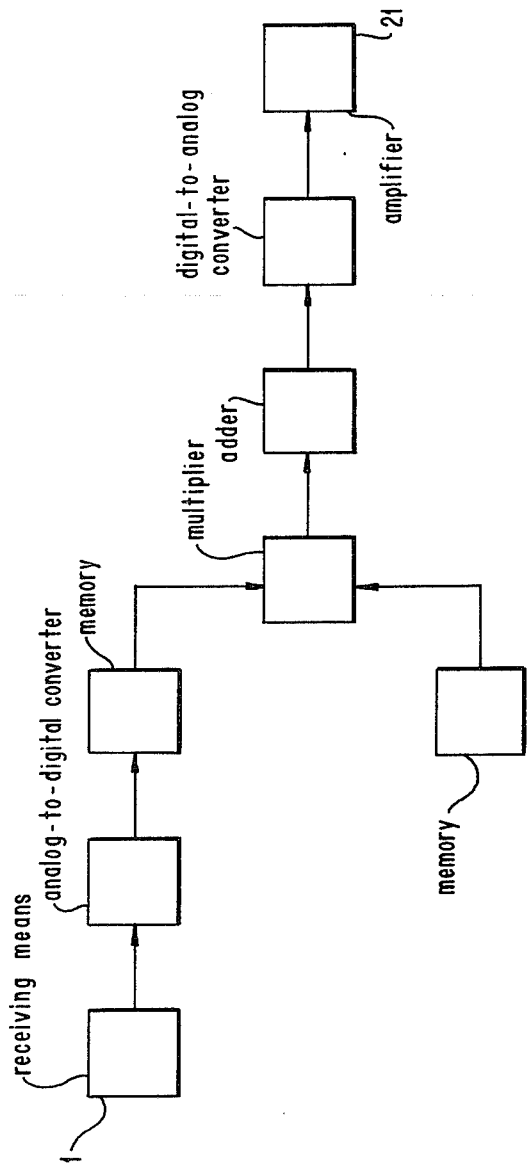
FIG. 7 is a block diagram of a digital matched filter.

It should be noted that the matched filter in the foregoing embodiment processes echo signals in an analog form, the matched filter may also be constructed so as to digitally process reception signals. As illustrated in FIG. 7, the digital matched filter may comprise (i) an analog-to-digital converter for converting reception signals from the receiving means 1, (ii) a first memory circuit for storing output signals from the A/D converter, (iii) a second memory for storing weighting values, (iv) a high speed multiplier for multiplying output signals read out from the first memory by weighting values from the second memory, (v) a digital adder for adding output signals from the multiplier to one another, and (vi) a digital-to-analog converter for converting output signals from the digital adder to ones in an analog form, the output signals of which are supplied to the amplifier 21.

While the invention has been described in detail and with reference to specific embodiments thereof, it will be apparent to one skilled in the art that various changes and modifications can be made therein without departing from the spirit and scope of the invention.

What is claimed is:

1. A detection system for receiving incoming signals from a plurality of directions and presenting a display resulting from the received incoming signals on an indicating means, comprising:
   a. receiving means for receiving incoming signals and varying the frequency of the incoming signals to produce a Doppler effect,
   b. a matched filter connected to pulse-compress output signals from said receiving means,
   c. indicating means connected to display output signals from said matched filter, and
   d. control means connected to control said receiving means and indicating means, whereby said receiving means and indicating means are coupled to one another.

2. A detective system as defined in claim 1 wherein the receiving means comprises a mechanically movable receiving element.

3. A detection system as defined in claim 2 comprising means for rotating the receiving element.

4. A detection system as defined in claim 1 wherein the receiving means comprises
   (i) a plurality of receiving elements disposed on at least one line, and
   (ii) switching means for successively switching said plurality of receiving elements.

5. A detection system as defined in claim 4 wherein the plurality of receiving elements are fixedly mounted equally spaced on a circle or an arc of a circle, said switching means successively switching said receiving elements at a constant speed.

6. A detection system as defined in claim 4 wherein the plurality of receiving elements are mounted on two parallel circles circumscribed around an imaginary cylinder in such a way that a half of the receiving elements are mounted on a first of said parallel circles and the remaining half of the receiving elements are mounted on the second circle respectively, each of the receiving elements on said first circle and the adjacent receiving element on the second circle being substantially equidistantly spaced, and being successively switched at a constant speed.

7. A detection system as defined in claim 4 wherein the plurality of receiving elements are positioned equally spaced in a straight line.

8. A detection system as defined in claim 1 wherein the matched filter comprises
   a. an analog delay line having a plurality of output taps, for transferring and storing the output signals from the receiving means therein,
   b. a weighting circuit connected to the output taps of said analog delay line and comprised of resistors, and
   c. a summing circuit connected to add the output signals from said weighting circuit.

9. A detection system as defined in claim 1 wherein the matched filter comprises a surface acoustic wave device.

10. A detection system as defined in claim 1 wherein the matched filter comprises
   a. an analog-to-digital converter connected to convert the output signals from the receiving means,
   b. a first storing means connected to store output signals from said analog-to-digital converter,
   c. a second storing means connected to store weighting values,
   d. a multiplier connected multiply output signals read out from said first memory by weighting values from said second memory, and
   e. digital adder connected to add the output signals from said multiplier.

11. A detection system as defined in claim 1 wherein the receiving means comprises
   a. a plurality of substantially equally spaced receiving elements mounted on at least one line,
   b. switching means connected to successively switch said plurality of receiving elements, and
   c. smoothing means operable in synchronism with said switching means connected to obtain received signals in such a way that the received signals caught by said plurality of receiving elements are derived in substantially the same way as derived from a single receiving element rotating at a constant speed.

12. A detection system for receiving incoming signals from a plurality of directions and presenting a display resulting from the received incoming signals on an indicating means, comprising:
   a. a plurality of substantially equally spaced receiving elements positioned on a circle or an arc of a circle and means successively switching said elements so that the signals received thereby are derived in substantially the same way as from a single receiving element rotating at a constant speed,
   b. a matched filter connected to pulse-compress the derived output signals from said plurality of receiving elements,
   c. indicating means connected to display the output signals from said matched filter, and
   d. control means connected to control said receiving means and indicating means whereby the indicating means and receiving means are coupled with one another.

13. A detection system for receiving incoming signals from a plurality of directions and presenting a display resulting from the received incoming signals on an indicating means, comprising:
   a. a receiving means for receiving incoming signals,
   b. a matched filter connected to pulse-compress the output signals from said receiving means,
   c. indicating means connected to a display output signals from said matched filter, and
   d. control means connected to control said receiving means and indicating means whereby the receiving means and indicating means are coupled to one another,
   said receiving means comprising
   (i) a plurality of equally spaced receiving elements designated by consecutive numbers and disposed on a circle or an arc of a circle,
   (ii) switching means connected to successively switch said plurality of receiving elements at a predetermined speed to derive received signals,
   (iii) a signal generator for producing first and second interpolating signals shifted by a half period with respect to one another,
   (iv) a first multiplier connected to multiply the reception signals from the receiving elements designated by odd numbers, by the first interpolating signals,
   (v) a second multiplier connected to multiply the reception signals supplied from the receiving elements designated by even numbers, by the second interpolating signals, and
   (vi) summing means connected to add the output signals from said first and second multipliers.

14. A detection system as defined in claim 13 wherein said interpolating signals are sine waves or cosine waves.

* * * * *